United States Patent
Eifel et al.

(10) Patent No.: US 9,574,449 B2
(45) Date of Patent: Feb. 21, 2017

(54) INTERNALLY COOLABLE COMPONENT FOR A GAS TURBINE WITH AT LEAST ONE COOLING DUCT

(75) Inventors: Marcel Eifel, Essen (DE); Daniel Gloss, Mulheim an der Ruhr (DE); Andreas Heselhaus, Dusseldorf (DE); Stephan Klumpp, Mettmann (DE); Marco Link, Oberhausen (DE); Uwe Sieber, Mulheim an der Ruhr (DE); Stefan Volker, Moers (DE); Michael Wagner, Dinslaken (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 425 days.

(21) Appl. No.: 14/237,871

(22) PCT Filed: Aug. 2, 2012

(86) PCT No.: PCT/EP2012/065096
§ 371 (c)(1),
(2), (4) Date: Feb. 8, 2014

(87) PCT Pub. No.: WO2013/023928
PCT Pub. Date: Feb. 21, 2013

(65) Prior Publication Data
US 2014/0193241 A1    Jul. 10, 2014

(30) Foreign Application Priority Data
Aug. 18, 2011  (EP) .................................. 11177976

(51) Int. Cl.
F01D 5/18  (2006.01)
F02C 7/12  (2006.01)

(52) U.S. Cl.
CPC .................. *F01D 5/187* (2013.01); *F02C 7/12* (2013.01); *F05D 2260/22141* (2013.01)

(58) Field of Classification Search
CPC ... F01D 5/18; F01D 5/187; F05D 2260/22141
See application file for complete search history.

(56) References Cited

U.S. PATENT DOCUMENTS 6,142,734 A * 11/2000 Lee ...................... F01D 5/189
                                                                  249/117
6,408,628 B1  6/2002 Pidcock et al.
(Continued)

FOREIGN PATENT DOCUMENTS

CN  1629449 A  6/2005
EP  1098141 A1  5/2001
(Continued)

OTHER PUBLICATIONS

RU Grant Decision, dated Jun. 2, 2016, for RU registration No. 2014110486/06.

*Primary Examiner* — Christopher M Koehler
(74) *Attorney, Agent, or Firm* — Beusse Wolter Sanks & Maire

(57) ABSTRACT

An internally coolable component for a gas turbine with at least one cooling duct, on the inner surface of which swirl elements are arranged in the form of turbulators which extend transversely with respect to the main flow direction of a coolant is provided. In order to reduce pressure losses for the coolant in the cooling duct, pins with different heights are set up between the turbulators.

6 Claims, 2 Drawing Sheets

(56) References Cited

U.S. PATENT DOCUMENTS

| | | | |
|---|---|---|---|
| 6,929,451 B2* | 8/2005 | Gregg | F01D 5/16 |
| | | | 416/500 |
| 6,969,230 B2 | 11/2005 | Shi | |
| 7,008,179 B2* | 3/2006 | Rinck | F01D 5/16 |
| | | | 415/119 |
| 7,575,414 B2 | 8/2009 | Lee | |
| 7,694,522 B2* | 4/2010 | Nakae | F23R 3/002 |
| | | | 60/752 |
| 7,901,183 B1 | 3/2011 | Liang | |
| 8,573,923 B2 | 11/2013 | Tibbott | |
| 9,335,049 B2* | 5/2016 | Cunha | F23R 3/005 |
| 2006/0222497 A1* | 10/2006 | Lee | F01D 5/186 |
| | | | 416/97 R |
| 2008/0264065 A1 | 10/2008 | Gerendas | |

FOREIGN PATENT DOCUMENTS

| | | |
|---|---|---|
| EP | 1431514 A2 | 6/2004 |
| EP | 1544411 A2 | 6/2005 |
| EP | 2236752 A2 | 6/2010 |
| EP | 2236752 A2 | 10/2010 |
| JP | 2002188406 A | 7/2002 |
| JP | 2005061725 | 3/2005 |
| JP | 2005180439 A | 7/2005 |
| JP | 2006283763 A | 10/2006 |
| RU | 2151303 C1 | 6/2000 |
| RU | 2321754 C1 | 4/2008 |

* cited by examiner

INTERNALLY COOLABLE COMPONENT FOR A GAS TURBINE WITH AT LEAST ONE COOLING DUCT

CROSS REFERENCE TO RELATED APPLICATIONS

This application is the US National Stage of International Application No. PCT/EP2012/065096 filed Aug. 2, 2012, and claims the benefit thereof. The International Application claims the benefit of European Application No. EP11177976 filed Aug. 18, 2011. All of the applications are incorporated by reference herein in their entirety.

FIELD OF INVENTION

The invention relates to an internally coolable component for a gas turbine, having at least one cooling duct, on the inner surface of which are arranged turbulence elements in the form of turbulators extending transversely with respect to the main flow direction of a coolant.

BACKGROUND OF INVENTION

Known examples of internally coolable components of the generic type are turbine blades of static gas turbines having, inside them, cooling ducts arranged in a straight or serpentine manner. A turbine blade of this type is disclosed in EP 1 431 514 A2. On the inner surface thereof there are arranged turbulators, also termed cooling ribs, extending largely transversely with respect to the main flow direction of a coolant, for example cooling air. The cooling ribs improve the mixing of the coolant and thus increase the heat transfer from the wall into the coolant. Simultaneously, according to EP 1 431 514 A2, what are termed pins are also provided in a central section of the cooling duct between the cooling ribs and are of different heights depending on their position on the chord and their spanwise position. Both in EP 1 431 514 A3 and in U.S. Pat. No. 7,901,183, the pins connect the suction-side blade airfoil wall to the pressure-side blade airfoil wall.

A disadvantage of this is that the cooling ribs increase the flow resistance and lead to greater pressure losses. If pressure losses are too great, hot gas can be drawn in through cooling air outlet openings through which the coolant is in fact supposed to flow out. This can lead to the destruction of the blade. For this reason, and for reasons of efficiency, the pressure losses arising in the cooling duct should be kept as small as possible.

Usually, the cooling duct cross section and the shape, size, arrangement and distribution of the turbulators are matched such that sufficient coolant pressure can be provided at the cooling air outlet openings, such that hot gas is not drawn in.

There is however still the need to further reduce the pressure losses in the cooling duct of internally cooled gas turbine components.

SUMMARY OF INVENTION

It is therefore an object herein to provide a component for a gas turbine which is internally coolable in a particularly efficient manner.

This object is achieved with an internally coolable component according to the features described herein. Advantageous configurations of the invention are further indicated herein, wherein the features can be combined with one another as desired.

It is provided that the height of the pins is less than the height of the cooling ribs and that successive pins, as seen in a main flow direction of the coolant, which are set up between the turbulators are of different heights. The surface between two cooling ribs is equipped with pins which present a smaller flow resistance than the cooling ribs and impart no longitudinal vortices to the flow but rather only disrupt the boundary layer or the formation thereof and thus increase the turbulence in the coolant. It is thereby possible, with respect to the conventional separations between the rib-shaped turbulators, to increase the separations and reduce the pressure loss without simultaneously reducing the cooling effect.

It is preferably provided that the height of the pins gradually increases in the main flow direction. The height of the pins preferably corresponds, on average, to the thickness of the boundary layer. The gradual increase in height therefore follows the increasing thickness of the boundary layer. This means that only the boundary layer is mixed. Mixing of the main flow flowing in the center of the cooling duct, which first and foremost would only lead to pressure losses but not to a significant increase in heat transfer, can thus be avoided. In this way, the accompanying pressure losses are kept small and the heat transfer is maximized.

The internally coolable component can of course be configured as a turbine blade, for example as a turbine guide vane, as a turbine rotor blade or as a guide ring segment. Guide ring segments lie opposite the tips of the blade airfoils of rotor blades and delimit the hot gas path of the gas turbine.

It is expedient for the rib-shaped turbulators to be inclined at a predefined angle, preferably 45°, with respect to the main flow direction.

BRIEF DESCRIPTION OF THE DRAWINGS

Further advantages and features of the invention will be described in more detail with reference to a preferred exemplary embodiment in the following description of the figures, in which.

DETAILED DESCRIPTION OF INVENTION

Figure 1:
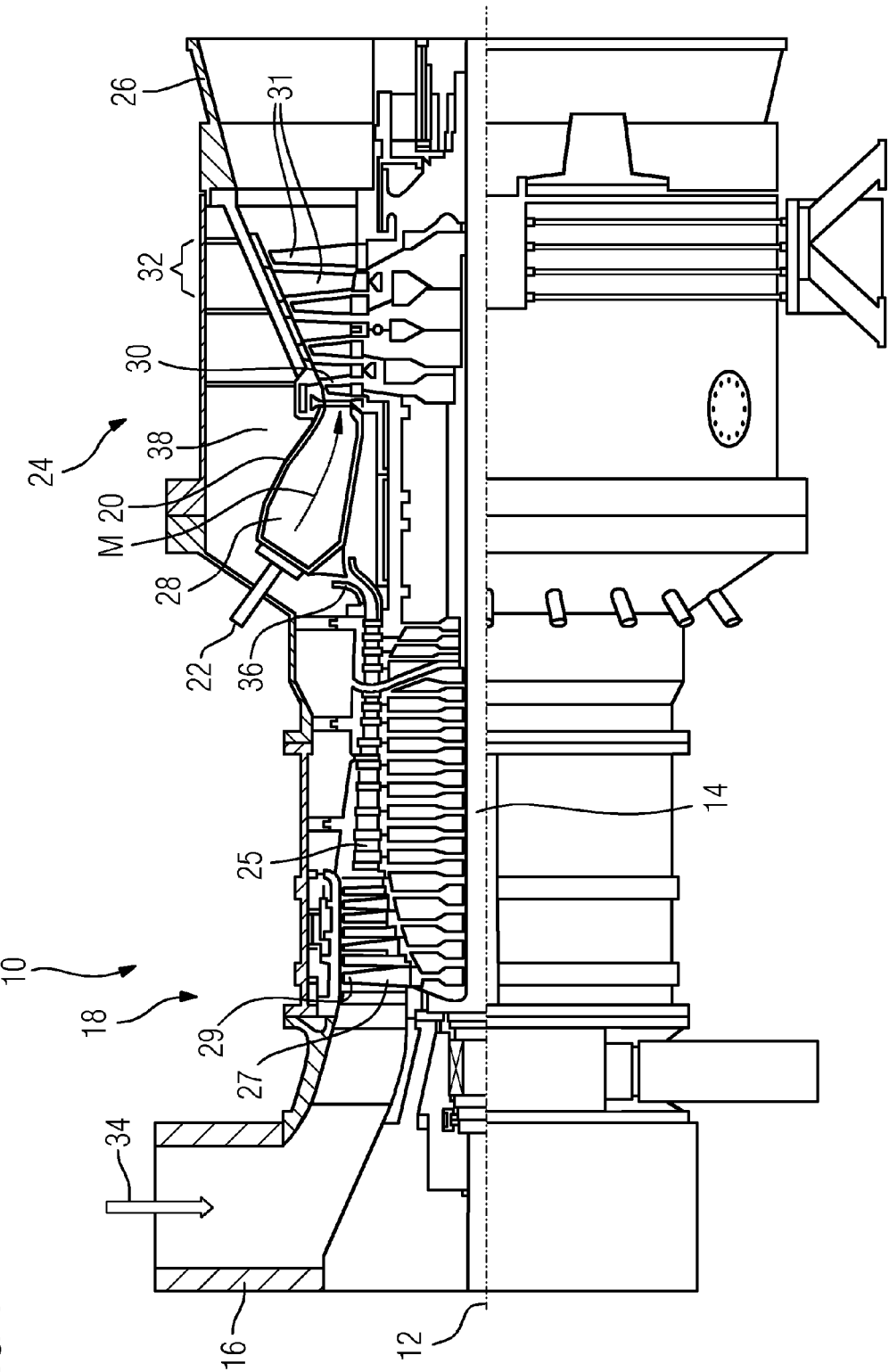
FIG. 1 shows a gas turbine in longitudinal partial cross section.

FIG. 1 shows a static gas turbine 10 in longitudinal section. The gas turbine 10 has, inside it, a rotor 14 which is mounted rotatably about an axis of rotation 12 and which is also designated as a turbine rotor. Along the rotor 14 there are, in succession, an intake housing 16, an axial turbocompressor 18, a toroidal annular combustor 20 having a plurality of burners 22 arranged rotationally symmetrically with respect to one another, a turbine unit 24 and an exhaust housing 26.

The axial turbocompressor 18 encompasses an annular compressor duct 25 containing successive compressor stages—in the manner of a cascade—comprising rotor blade rings and guide vane rings. The rotor blades 27 arranged on the rotor 14 lie with their free-ended blade airfoil tips 29 opposite an outer duct wall. The compressor duct 25 opens, via a compressor outlet diffuser 36, into a plenum 38. The annular combustor 20 with its combustion space 28 is provided in this plenum, wherein the combustion space is in communication with an annular hot gas duct 30 of the turbine unit 24. Four successive turbine stages 32 are arranged in the turbine unit 24. A generator or a working machine (in each case not shown) is coupled to the rotor 14.

When the gas turbine 10 is in operation, the axial turbocompressor 18 draws in ambient air 34, as the medium to be compressed, through the intake housing 16 and compresses it. The compressed air is fed through the compressor outlet diffuser 36 into the plenum 38, whence it flows into the burners 22. Fuel also passes via the burners 22 into the combustion space 28. There, with the addition of the compressed air, the fuel is burned to give a hot gas M. The hot gas M then flows into the hot gas duct 30 where it expands, performing work, at the turbine blades of the turbine unit 24. The energy released thereby is taken up by the rotor 14 and is used on one hand to drive the axial turbocompressor 18 and on the other hand to drive a working machine or electric generator.

Figure 2:
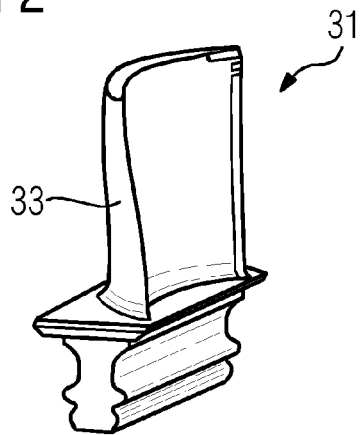
FIG. 2 shows a turbine blade as internally coolable component in a perspective representation.

FIG. 2 shows in perspective representation a turbine blade 31 for the gas turbine 10 described in more detail above. The turbine blade 31 is configured as an internally coolable component. This means that a cooling duct 35 extends inside it, in particular through its blade airfoil 33 (FIG. 3).

Figure 3:
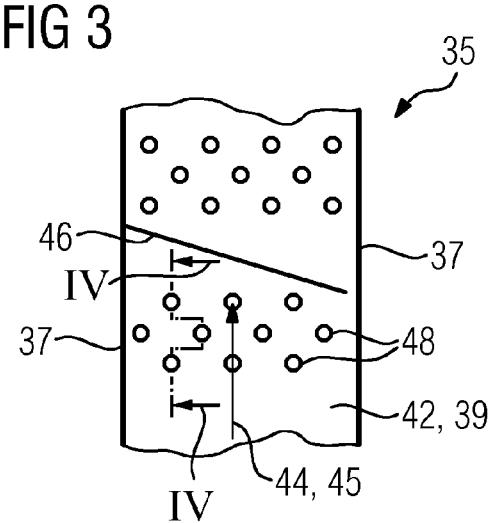
FIG. 3 shows the longitudinal section through a cooling duct having turbulators and pins arranged on its inner surface.
Figure 4:
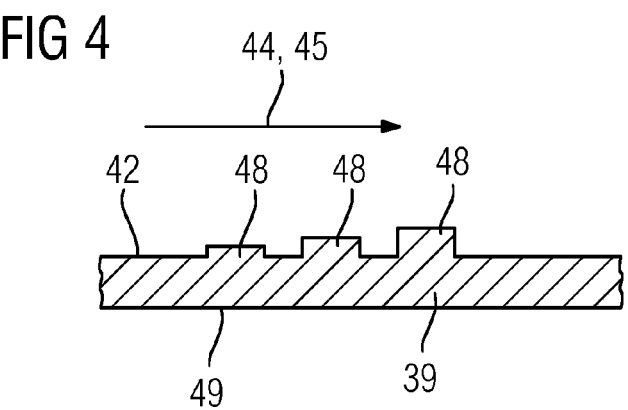
FIG. 4 shows the cross section through successive pins.

A longitudinal section through the cooling duct 35 is shown schematically in FIG. 3. The cooling duct 35 is delimited laterally by two sidewalls 37. Between these there extends a third delimiting wall 39 of the cooling duct 35. The rear side 49 (FIG. 4) of the third delimiting wall 39 is exposed to a hot gas flow. Turbulence elements in the form of rib-shaped turbulators 46, of which only one is represented, are set up at regular intervals on an inner surface 42 of the delimiting wall 39 so as to extend transversely with respect to a main flow direction 44. The rib-shaped turbulators are also termed cooling ribs. Fields of what are called pins 48 are located between the successive cooling ribs. Each pin 48 is cylindrical. The pins 48 are arranged in a grid pattern in the fields, wherein the height of the pins, as shown in FIG. 4, increases in the flow direction 44. The height of the pins is however less than the height of the cooling ribs.

With the aid of this arrangement, it is possible for a coolant 45 flowing in the cooling duct 35 to be mixed only at the boundary layer and thus for the heat transfer to be increased. Mixing of the main flow, above the boundary layer, which moreover leads to an increase in pressure losses, can be avoided. By reducing the pressure losses in the coolant 45, the pressure of the coolant supply can be reduced, contributing to an increase in the efficiency of the gas turbine 10.

Overall, the invention relates to an internally coolable component for a gas turbine 10 having at least one cooling duct 35, on the inner surface 42 of which are arranged turbulence elements 46 in the form of turbulators 46 extending transversely with respect to the main flow direction of a coolant. In order to reduce pressure losses in the cooling duct 35 for the coolant 45, it is provided that pins 48 of different heights are set up between the turbulators 46.

The invention claimed is:

1. An internally coolable component for a gas turbine, comprising;
at least one cooling duct,
cooling ribs formed in an inner surface of the at least one cooling duct and which extend transversely with respect to a main flow direction of a coolant, wherein the coolant flows over the cooling ribs, and
a plurality of pins disposed between adjacent cooling ribs, wherein with respect to the main flow direction successive pins are characterized by different heights,
wherein the different heights of the plurality of pins are less than a height of the cooling ribs.

2. The component as claimed in claim 1, wherein successive pins of the plurality of pins, as seen in the main flow direction of the coolant, are of increasing heights.

3. The component as claimed in claim 1, wherein the cooling ribs are configured such that respective long axes of the cooling ribs form a predefined angle with respect to the main flow direction.

4. The component as claimed in claim 3, wherein the predefined angle is 45 degrees.

5. The component as claimed in claim 1, wherein the component is configured as a turbine blade.

6. The component as claimed in claim 1, wherein the component is configured as a guide ring segment.

* * * * *